A. W. JANSEN.
MARKER FOR SCALES AND THE LIKE.
APPLICATION FILED JAN. 20, 1914.

1,104,424.

Patented July 21, 1914.

Witnesses:
W. A. Courtland
Emil Foster, Jr.

Alfred W. Jansen Inventor
By his Attorney
H. C. Workman

UNITED STATES PATENT OFFICE.

ALFRED W. JANSEN, OF NEW YORK, N. Y.

MARKER FOR SCALES AND THE LIKE.

1,104,424.

Specification of Letters Patent.

Patented July 21, 1914.

Application filed January 20, 1914. Serial No. 813,209.

*To all whom it may concern:*

Be it known that I, ALFRED W. JANSEN, a citizen of the United States, residing in New York, county and State of New York, have invented a new and useful Marker for Scales and the like; and in order that others may understand, make, and use my invention I give the following specification thereof.

My invention relates to indicating scales or the like used for measuring weight or other standards of measurement, and in which an indicator or pointer moves over a graduated scale and automatically returns to zero position when the object being measured is removed; and the object of my invention is to provide a marker of simple construction and inexpensive to manufacture to mark the weight or other quantity measured by the position of the indicator or pointer when the latter has returned to initial or zero position.

I have more particularly contemplated employing my invention in spring or similar scales, especially those used in hospitals and nurseries for measuring the weight of infants from time to time in order to determine appropriate dietary regulation, or for other purposes. Accordingly I have illustrated my invention herein in connection with such scales: although it is obvious that my invention may be used in connection with other scales or measuring devices.

Figure 1:
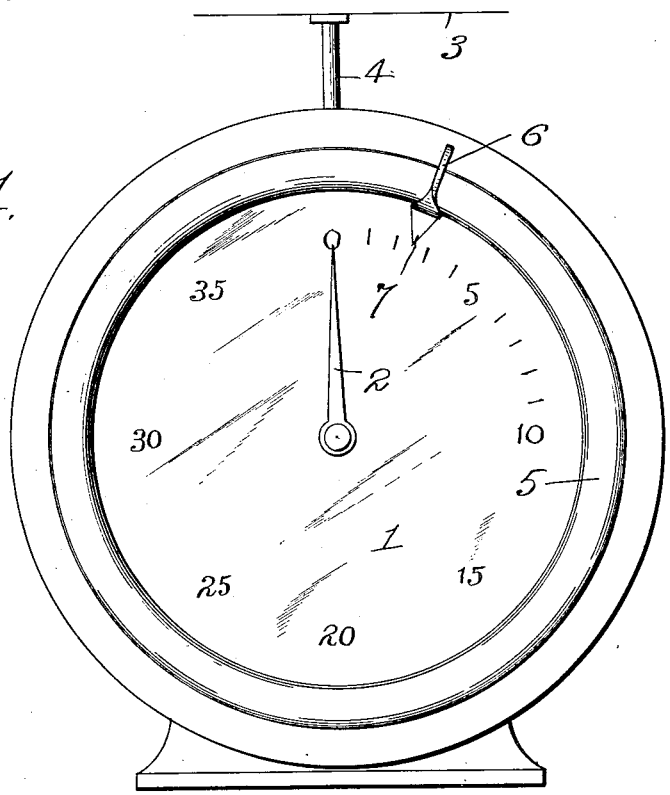
Figure 2:
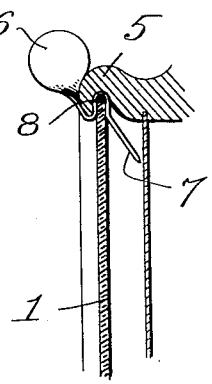

In the accompanying drawing, which forms part of this specification Figure 1 represents a front view of a scale in which my invention is employed: Fig. 2 is a sectional view taken through the bezel and glass cover of the dial and showing how the marker is combined therewith.

The scale shown has a circular dial covered by a glass 1, beneath which is the dial proper having graduations marked around its periphery. The indicator 2, mounted concentrically of the dial, swings about its axis in response to a weight, or the body to be weighed, placed on the platform 3, supported on the standard 4. On the weight or body being removed from the platform, the indicator 2 immediately returns to zero position, according to the well known operation of scales of the character indicated. Unless the weight indicated by the indicator while the object is on the platform 3, be immediately noted down it is likely to be forgotten: and also there is likely to be difficulty in accurately reading the indication when a living object, such as an infant, is being weighed. To overcome such difficulties I have combined with the dial a marker which may be readily moved about the periphery of the dial into registry with any position of the indicator 2, where it remains, marking the weight indicated: so that the next time the object is weighed it may be seen at a glance whether its weight has diminished or increased,—or the weight indicated by the marker may be noted down at leisure.

The marker is so combined with the glass 1 and bezel 5, in which the glass is mounted, that it is guided and supported thereby with the finger-piece 6 of the marker on the exterior of the bezel while the indicating or index portion 7, is on the interior, or beneath the glass 1. I construct the marker of a single piece of metal so that the same is integral and without loose parts. The indicating portion 7 is formed to provide a point, as shown in Fig. 1, and is inclined downwardly from the glass 1 toward the dial proper, as seen in Fig. 2. The intermediate portion of the marker extends from the index portion 7 substantially parallel with the glass 1 to the edge thereof, is bent over said edge, between the glass and the bezel 5, underlying said bezel, and is then bent upwardly around the edge and over the rim of the bezel to overlie the same, being conformed to the cross-sectional form of the bezel, as seen in Fig. 2. This intermediate portion of the marker has thus substantially the form of a flattened S, as indicated at 8, Fig. 2, with the glass 1 embraced between the middle and lower limbs of the S, and the bezel embraced between the middle and upper limbs of the S. From the intermediate portion, the marker extends upwardly and outwardly to form the finger-piece 6. This portion is at right angles to the plane of the metal and to the other portions of the marker, as shown.

From the foregoing it will be seen that the marker is held in place by the glass and the bezel, and may readily be adjusted to any position of the indicator 2 by applying the hand to the fingerpiece. The index portion of the marker may be distinctively colored to enable its indication to be readily and clearly observed. By the construction and form of marker described no drilling or shaping of the glass is required, and the same may be inexpensively constructed and applied to a scale, while the process of weighing and keeping record of the weights indicated is facilitated and simplified.

What I claim is;

The combination with the bezel and glass of a dial, of a marker slidably mounted on said bezel, said marker having an intermediate portion substantially S-shaped, the lower and middle limbs of said S portion embracing the edge of the glass, the upper and middle limbs of said S portion embracing the bezel, an index portion extending from the lower extremity of said S toward the dial proper, and a finger-piece extending from the upper extremity of said S portion.

ALFRED W. JANSEN.

Witnesses:
 MARY ELESTON,
 KATE GOLDSMITH.